United States Patent [19]

Espy

[11] Patent Number: 4,671,409

[45] Date of Patent: Jun. 9, 1987

[54] DISPOSABLE LIGHT-TIGHT CANISTER

[75] Inventor: James R. Espy, St. Paul, Minn.

[73] Assignee: Minnesota Mining and Manufacturing Company, St. Paul, Minn.

[21] Appl. No.: 811,830

[22] Filed: Dec. 20, 1985

[51] Int. Cl.$^4$ ..................... B65D 85/67; B65D 85/38
[52] U.S. Cl. ..................... 206/397; 206/54; 206/406; 206/407; 206/416; 242/55.53; 242/129.5; 53/409
[58] Field of Search ............ 206/54, 397, 405, 406, 206/407, 413, 415, 416, 493; 53/409, 581; 242/55.2, 55.53, 129.5

[56] References Cited

U.S. PATENT DOCUMENTS

| | | | |
|---|---|---|---|
| 840,651 | 1/1907 | Otto | 242/55.2 |
| 1,354,170 | 9/1920 | Cook | 242/55.2 |
| 2,529,420 | 11/1950 | Ramquist | 242/55.2 |
| 2,927,710 | 3/1960 | Raber | 216/33 |
| 3,307,688 | 3/1967 | Widmont, Jr. | 206/52 |
| 3,337,157 | 8/1967 | Plog | 242/129.8 |
| 3,346,208 | 10/1967 | Hoffman et al. | 242/55.2 |
| 3,457,075 | 7/1969 | Morgan et al. | 96/67 |
| 3,532,210 | 10/1970 | Minion et al. | 206/52 |
| 3,746,178 | 7/1973 | Wagschal | 220/23.6 |
| 3,756,392 | 9/1973 | Oehlmann | 206/59 E |
| 3,907,109 | 9/1975 | Primicerio et al. | 206/406 |
| 3,937,325 | 2/1976 | Dodge et al. | 206/387 |
| 3,944,148 | 3/1976 | Freeman et al. | 242/55.53 |
| 3,981,400 | 9/1976 | Quintana | 206/407 |
| 4,009,845 | 3/1977 | Santucci et al. | 242/137.1 |
| 4,034,891 | 7/1977 | Mecham | 220/339 |
| 4,083,449 | 4/1978 | Rubins | 206/405 |
| 4,130,200 | 12/1978 | Iepson et al. | 206/446 |
| 4,148,395 | 4/1979 | Syracuse et al. | 206/414 |
| 4,239,164 | 12/1980 | Barnsbee et al. | 206/409 |
| 4,291,802 | 9/1981 | Buelens | 206/409 |
| 4,296,857 | 10/1981 | Huck | 206/53 |
| 4,302,102 | 11/1981 | Stark et al. | 355/72 |
| 4,320,834 | 3/1982 | Tamaki | 206/404 |
| 4,431,139 | 2/1984 | Barnsbee et al. | 242/55.53 |
| 4,537,366 | 8/1985 | Swenson et al. | 242/137 |
| 4,555,023 | 11/1985 | Sykes et al. | 206/446 |

FOREIGN PATENT DOCUMENTS 602393  4/1978  U.S.S.R. ............. 206/405

Primary Examiner—William Price
Assistant Examiner—Brenda J. Ehrhardt
Attorney, Agent, or Firm—Donald M. Sell; James A. Smith; David W. Anderson

[57] ABSTRACT

A light-tight, self-contained canister for preventing a roll of core wound photosensitive media, used in a microfiche or microfilm reader-printer, from being damaged or exposed to actinic light during shipping, storing and dispensing. The canister includes an open ended opaque tubular sleeve closed at both ends by opaque end caps lockingly interconnected by a rigid tie bar extending longitudinally between the end caps along the core of the photosensitive media. At least one end of the tie bar includes a pair of resilient fingers. The fingers deform upon pressure engagement with a central receiving aperture formed in the end cap. Each end cap also includes a hub portion sized to rotatively support the roll of core wound media within the canister. Also, in an alternative embodiment, the fingers may be associated with the aperture and deformable upon engagement with the tie bar. In still another alternative embodiment, the interconnecting function of the tie bar may be incorporated into each end cap so that only one mold is required for its manufacture.

13 Claims, 9 Drawing Figures

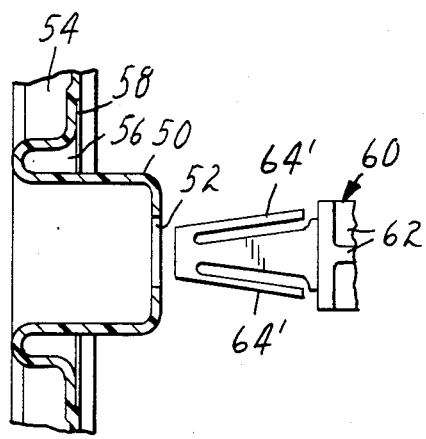
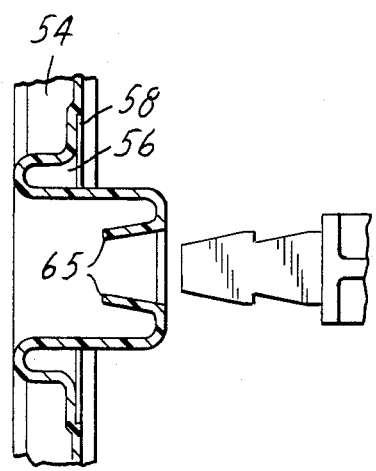
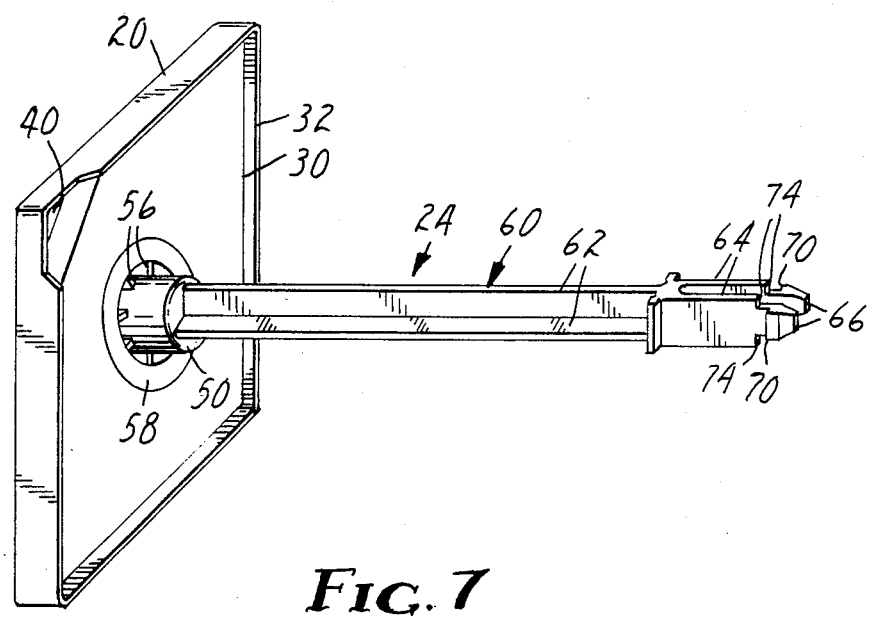

DISPOSABLE LIGHT-TIGHT CANISTER

FIELD AND BACKGROUND OF THE INVENTION

The present invention relates to a disposable canister, and more particularly to a light-tight canister for protecting a roll of core wound photosensitive media, containable therein, from being damaged or exposed to actinic light during shipping, storing and dispensing.

In the operation of a microfiche or microfilm reader-printer of, for example, the type illustrated in U.S. Pat. No. 4,302,102, a photosensitive media is fed from a roll as needed during production of enlarged copies of preselected images of the microfiche or microfilm. Because of the difficulty in loading reader-printers in lighted areas, they are capable of accepting preloaded canisters. These, preloaded canister, of the type illustrated in U.S. Pat. Nos. 4,431,139, 4,291,802, 3,756,392 and 3,532,210, are placed in the reader-printer and the photosensitive media is dispensed therefrom as needed while the canister prevents the unused portion of the media from being exposed. However, there are several problems and limitations associated with such prior canisters, most noteably those associated with assembling and/or preloading the canisters in a red-light room or darkroom. Specifically, the canisters have generally required fastening by such means as soldering, welding, hot melting, gluing, stapling, or other fastening means which are particularly time-consuming and/or difficult when performed in a red-light room or darkroom. In addition, when performed in an enclosed protective environment, venting of the fumes or heat is necessary.

Further, in an attempt to overcome some of the above limitations, rolls of the core wound photosensitive media have been protected by opaque bags and/or covered by opaque leaders wound around the media. However, although less expensive and less time consuming, such attempts have failed to adequately protect the photosensitive media from physical damage and have not adequately protected the media from exposure if the cover became ripped or torn during shipping, storing and dispensing. In addition, once the media was loaded into the reader-printer, and service or inspection was required, the photosensitive media would be exposed when the housing was opened.

The canisters as discussed above do not describe a disposable light-tight canister including a self-centering mechanical fastening means, whereby a canister can be easily assembled and loaded in a red-light or darkroom with a minimum of difficulty. In addition, notwithstanding the simplicity of construction, the canister must be rugged enough for short term disposable use to protect the photosensitive media from being damaged or exposed to actinic light during shipping, storing and dispensing. Further, despite the needs of the canister, it must be inexpensive to manufacture.

SUMMARY OF THE INVENTION

The invention described herein contemplates a light-tight canister, specifically a self-contained canister for containing a roll of core wound photosensitive media. The canister is used in microfiche or microfilm reader-printers to dispense the media therefrom as needed, and to protect the media from being damaged or exposed to actinic light during shipping, storing and dispensing. The canister includes an open ended opaque tubular sleeve, two opaque end caps and a tie bar for lockingly interconnecting the two end caps with the sleeve therebetween. Each end cap includes a central hub portion sized so that interconnection of the end caps permits free rotation of the roll of core wound media contained within the canister. In addition, each end cap includes inner and outer peripheral wall flanges defining a light-tight peripheral groove for receiving each end of the canister sleeve so that the sleeve is light sealingly retained between the end caps.

The tie bar includes a central shaft portion having a pair of resilient fingers on each end thereof. Pressure engagement of the resilient fingers with central apertures formed in each end cap, inwardly deforms both fingers. Upon passing through the aperture, the fingers spring back and lock to interconnect the end caps and tie bar, and to retain the canister sleeve therebetween. In addition, each finger includes a truncated, inclined end portion to facilitate inward deformation of the resilient fingers upon pressure engagement with the aperture. Further, each finger includes a detent which lockingly engages a corresponding rim extending outwardly about the peripheral edge of the central aperture to lock the fingers in the aperture after they spring back. As an alternative, the pairs of resilient fingers may be associated directly with the apertures, and deformable upon pressure engagement with the tie bar.

In an alternative embodiment the tie bar may be intergally formed as part of one end cap and pressure engageable with an aperture formed in the opposed end cap. In still another embodiment, the interconnecting function of the tie bar may be incorporated into an elongated central hub portion, and by providing the elongated hub portion of each end cap with a corresponding resilient finger and a corresponding central receiving aperture.

DESCRIPTION OF THE DRAWINGS

The present invention will be more fully described with reference to the accompanying drawings where like reference numerals identify corresponding components, and:

FIG. 5 is an enlarged, fragmentary cross-sectional view showing the details of an alternative embodiment of an end cap and tie bar;

FIG. 6 is an enlarged, fragmentary cross-sectional view showing the details of a second alternative embodiment of an end cap and tie bar;

FIG. 7 is a perspective view of an alternative embodiment of an end cap and tie bar combination;

DETAILED DESCRIPTION OF THE PREFERRED EMBODIMENT

Figure 1:
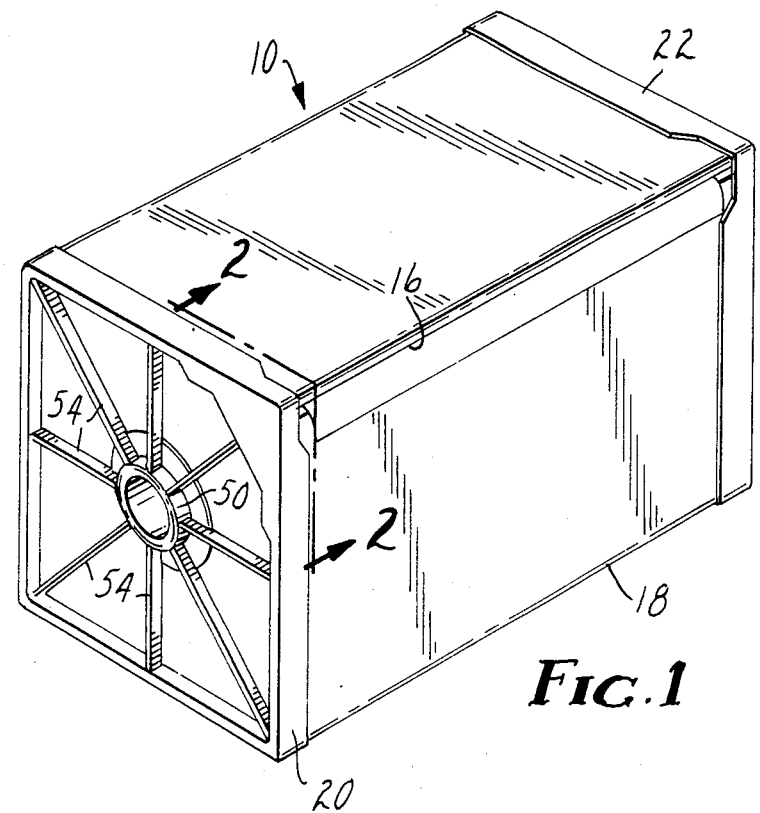
FIG. 1 is a perspective view of a canister constructed in accordance with the present invention.
Figure 2:
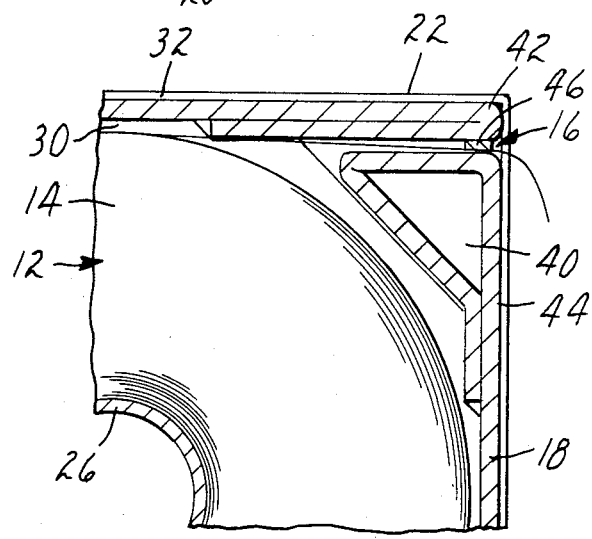
FIG. 2 is an enlarged cross-sectional view of a portion of the canister of FIG. 1 taken in the direction of arrows 2—2.
Figure 3:
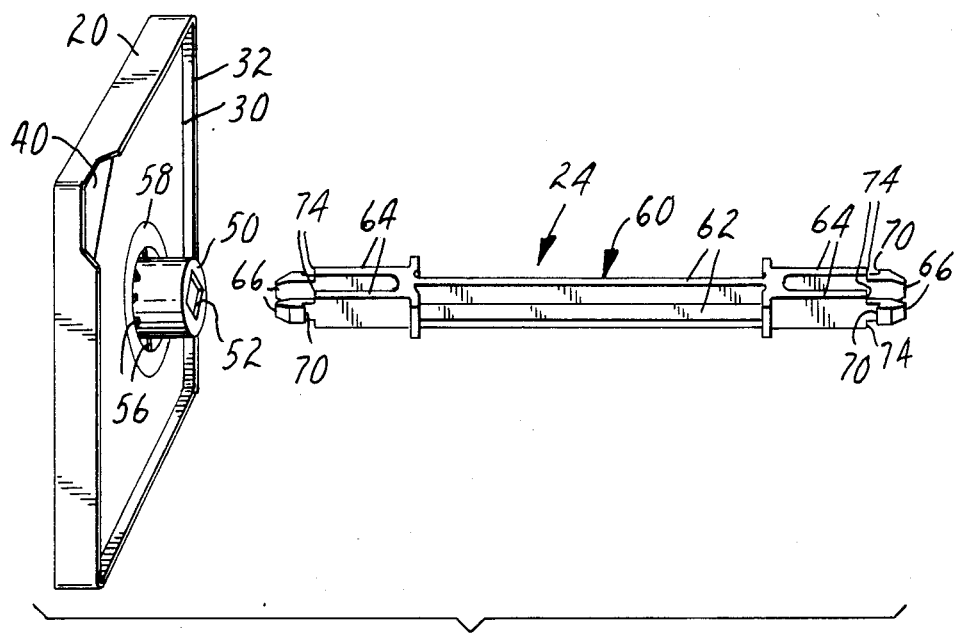
FIG. 3 is an exploded perspective view of an end cap and tie bar of the canister.
Figure 4:
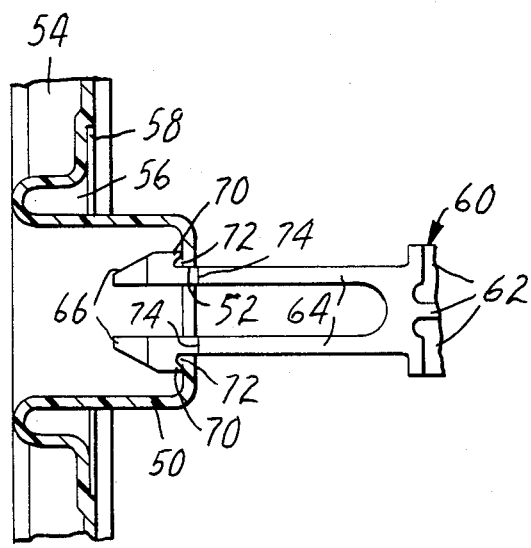
FIG. 4 is an enlarged, fragmentary cross-sectional view showing the details of the end cap and tie bar interconnection.

Referring to FIGS. 1 and 2 of the drawings, a disposable light-tight canister, generally designated 10, protects a roll 12 of core wound photosensitive media 14, contained therein. The preloaded canister 10 is used in connection with conventional microfiche and microfilm reader-printers (not shown) for dispensing the media contained within the canister 10 through a light-tight, longitudinal exit slot 16. The canister 10 includes an open ended opaque tubular sleeve 18 closed at both ends by two opaque end caps 20 and 22. As illustrated in FIGS. 3 and 4, a tie bar 24 lockingly interconnects the two end caps with the sleeve 18 retained therebetween, while permitting free rotation of the roll 12 of media 14.

The particular photosensitive media 14 does not form a part of the present invention and typically includes a roll 12 of media 14 wound around a hollow core 26 and having a width less than the length of the exit slot 16. A suitable media 14 is dry silver paper, of the type supplied by Minnesota Mining and Manufacturing Company (3M), identified by product No. 795, and disclosed in U.S. Pat. No. 3,457,075. Such media has a thermally developable coating on one side of a suitable backing. The coating is comprised of a combination of photosensitive silver halide and light-stable organic silver salt in conjunction with a reducing agent. The description of the present canister 10 and its use will proceed on the basis of this particular paper. It is to be understood that the invention is generally applicable to any flexible media.

The canister sleeve 18 can be made from any one of a variety of suitable opaque materials such as a polymeric material, fiberboard, or corrugated paperboard which possess the desired puncture, compression, and burst strength. In the preferred embodiment, the sleeve 18 is made from a blank of corrugated paperboard scored to facilitate folding, and folded or bent into a tube with two open ends and the exit slot 16 formed by the joining edges of the blank. The sleeve 18 is preferably rectangular, as illustrated in FIGS. 1 and 2, but may be cylindrical or other suitable shapes such as hexagonal or octagonal. In addition, sleeve 18 may be made by extruding a suitable polymeric material, such as polyvinyl chloride or polyethylene.

As illustrated in FIGS. 2 and 3 each end cap 20 and 22 includes an inner 30 and outer 32 peripheral flange to define a peripheral groove for receiving each end of the sleeve 18 therein. In addition, each end cap 20 and 22 includes an exit slot accommodating portion 40 for receiving an inwardly folded lip portion 42 and a curved lip portion 44 of the sleeve 18 of the canister blank. The lips 42 and 44 are provided to strengthen the sleeve 18, to define the exit slot 16, and to support a plush light seal 46 of velvet, felt or other suitable material which will not mar or blemish the media 14 when dispensed through the exit slot 16. In addition, the plush 46 prevents light from entering through the exit slot 16. In the preferred embodiment, the plush 46 is adhered to either the folded lip portion 42 or the curved lip portion 44, by a suitable adhesive, so that the plush 46 will contact the uncoated side of the media 14 to prevent maring or blemishing of the more sensitive coated side.

In addition, each end cap 20 and 22 includes a central hub portion 50 which extends from each end cap into the interior of the sleeve 18, as illustrated in FIGS. 3 and 4. A central receiving aperture 52 is formed in the most inward part of the central hub portion 50 for receiving the tie bar 24. To provide strength and rigidity, each end cap includes a plurality of exterior radial stiffening ribs 54 extending from the central hub portion 50. In addition, a plurality of interior radial stiffening ribs 56 may be provided. Further, a core centering guide 58 may be provided in the interior of the end caps 20 and 22 which retainingly receives the core 26 of the roll 12 of media 14.

The tie bar 24 includes a central shaft portion 60 comprised of a plurality of stiffening ribs 62 radiating from its center. As illustrated in FIGS. 3 and 4, a pair of resilient fingers 64 project from each end of the central shaft portion 60 and are received by each end cap central receiving aperture 52. Each finger 64 includes a truncated, inclined end portion 66 to facilitate inward deformation of the fingers 64 upon pressure engagement with the central receiving aperture 52 of the hub portion 50. In addition, each end portion 66 of the tie bar 24 includes a detent 70 which engages a corresponding rim 72 projecting about the peripheral edge of the aperture 52 to lock the resilient fingers 64 in the aperture after they spring back. Also, the fingers 64 include shoulders 74 which come in contact with and abut the hub portion 50 to limit the advance of the fingers. As an alternative, the tie bar 24 may include a pair of fingers 64' as illustrated in FIG. 5. Further, it is contemplated that a pair of fingers 65 may project from the edge of the central receiving aperture 52 as illustrated in FIG. 6.

For ease of manufacture and shipping, the end caps and tie bars in the preferred embodiment have been formed of separate members. However, it should be appreciated that in an alternative embodiment the tie bar 24 and one of the end caps 20 or 22 may be manufactured as an integral unit, as illustrated in FIG. 7.

Figure 8:
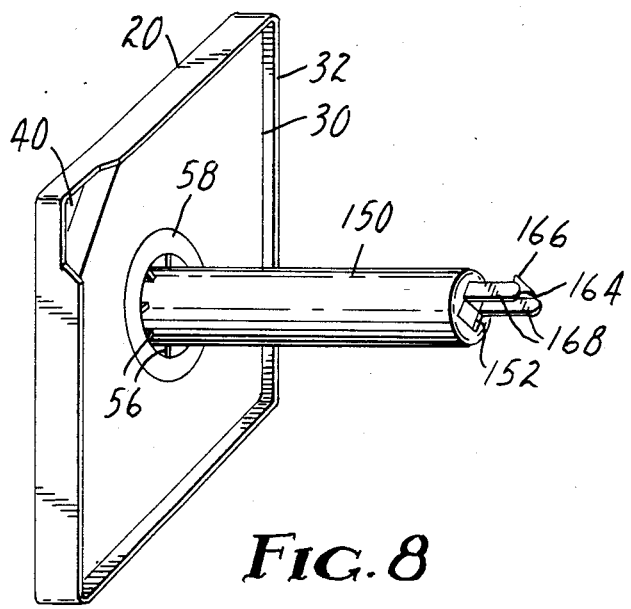
FIG. 8 is a perspective view of an additional alternative embodiment of an end cap which incorporates the function of the tie bar.
Figure 9:
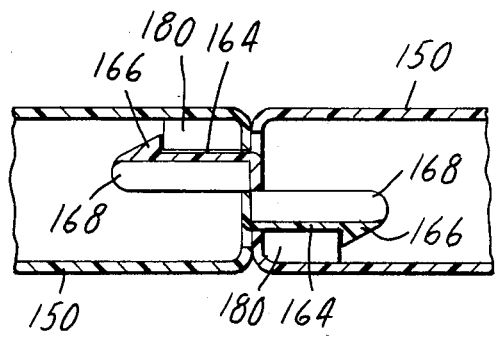
FIG. 9 is an enlarged, fragmentary cross-sectional view showing the details of two interconnected end caps of FIG. 8.

In another alternative embodiment, as illustrated in FIGS. 8 and 9, the interconnecting function of the tie bar 24 may be incorporated into a central hub portion 150 of the end caps 20 and 22, which extends about halfway within the canister 10 sufficient to come in contact with the hub portion of the opposing end cap so that only one mold is required for manufacture. In this embodiment, only one resilient finger 164 in combination with a pair of parallel guide members 168 is provided on each hub portion 150. They pass through a corresponding opposed central receiving aperture 152 located in the opposing end cap and are pressure engageable with a locking member 180. In addition, each finger 164 includes a truncated, inclined end portion 166 to facilitate inward deformation of each finger.

The end caps 20 and 22, and the tie bar 24 may be made from a variety of suitable materials and manufactured by several manufacturing processes well known to those skilled in the art. In the preferred embodiment, the end caps 20 and 22, and the tie bar 24 are injection molded of a polymeric material. It is only required that the material be opaque to prevent exposure of the media 14, and somewhat resilient to allow deformation of each finger 64.

Assembly and Use

The assembly and use of the canister 10 of the present invention will now be explained. To assemble the preferred embodiment of the canister 10, as illustrated in FIGS. 1–4, the sleeve 18 is first formed by folding the precut blank of corrugated paperboard. Next, the tie bar 24 is connected to one of the end caps 20 or 22, and the roll 12 of media 14 is placed on the tie bar and end cap subassembly. As an alternative, the roll 12 of media 14 may be placed on the hub portion 50 of an end cap, and the tie bar 24 then inserted along the core 26 of the roll 12 of media 14 and snapped into place. Next, the sleeve 18 is placed over the roll 12 of media 14 and positioned within the end cap peripheral groove formed by flanges 30 and 32. As the sleeve 18 is being positioned, the end of the media 14 should be guided along the light-tight exit slot 16 to extend therefrom. Lastly, the remaining end cap 20 or 22 is centered over the core 26 of the roll 12 of media 14 and the sleeve 18, and snapped into place to form a finished canister 10 of the present invention.

It should be appreciated that the canister of the present invention can be utilized with any imaging system, such as for example, copiers, printers, reader-printers, and the like, which require a photosensitive media.

While the preferred embodiment and several alternative embodiments of the present invention and the method for its assembly and use have been described so as to enable one skilled in the art to practice the device of the present invention, the preceeding description is intended to be exemplary and should not be used to limit the scope of the invention. The scope of the invention should be determined only by reference to the following claims.

I claim:

1. A light-tight, self-contained canister for preventing a roll of core wound photosensitive media, containable therein, from being damaged or exposed to actinic light during shipping, storing and dispensing, comprising:
    a canister sleeve for surrounding the roll of core wound photosensitve media, said sleeve having two open ends and a media exit slot running along one side of said sleeve parallel to the central axis of said roll of core wound photosensitive media;
    two opposed end caps for closing both ends of said sleeve, and at least one of said end caps having a central receiving aperture and both end caps having a peripheral edge cooperating with said open ends of said sleeve to form a light tight seal;
    a rigid tie bar extending longitudinally between said end caps along the central axis of said roll of core wound photosensitive media and said sleeve; and
    means for interlocking said tie bar to said end caps including resilient means associated with at least one end of said tie bar and at least one said end cap having said central receiving aperture for interconnecting said one end cap and said tie bar, whereby pressure engagement axially of said tie bar when aligned with said end cap interlocks said end caps and said tie bar to close said open ends of said sleeve with said sleeve therebetween.

2. The canister defined in claim 1 wherein said end cap having said central receiving aperture has hub means extending axially from said end cap toward said sleeve and said receiving aperture is positioned at an inner terminal end of said hub means whereby, upon said interlocking of said end cap and said tie bar said resilient means are disposed within said hub means.

3. The canister defined in claim 1, further comprising hub means extending from each of said end caps and engageable with the core of said roll of core wound photosensitive media for permitting the free rotation of said roll of core wound photosensitive media about its central axis.

4. The canister defined in claim 3, wherein each of said end caps includes stiffening ribs radiating from said hub means.

5. The canister defined in claim 1, wherein said resilient means includes a pair of fingers capable of resilient deformation upon contact with said tie bar so that said fingers spring back to interconnect said tie bar and end caps.

6. The canister defined in claim 1, wherein said resilient means includes a pair of fingers capable of resilient deformation upon contact with said aperture so that said fingers, upon passing through said aperture, spring back.

7. The canister defined in claim 1, wherein said resilient fingers include an undeformed dimension greater than that of said aperture, so that at least one shoulder abuts said aperture to retain said tie bar in contact with said corresponding end cap.

8. The canister defined in claim 7, further comprising locking means associated with said aperture for locking said pair of resilient fingers with respect to said aperture after they spring back.

9. The canister defined in claim 9, wherein each of said resilient fingers includes a detent which deforms upon pressure engagement with said aperture.

10. A light-tight, self-contained canister for preventing a roll of core wound photosensitive media, contained therein, from being damaged or exposed to actinic light during shipping, storing and dispensing, comprising:
    an opaque sleeve for surrounding the roll of core wound photosensitvie media, and said sleeve having two outer edges and a media exit slot running along one side of said sleeve parallel to the central axis of said roll of core wound photosensitive media;
    two opposed, similar opaque end caps each engageable with the outer edges of said sleeve, and each having a centrally protruding hub portion and a peripheral edge cooperating with said open ends of said sleeve to form a light tight seal, each of said hub portions extending axially from said end cap toward the opposed end cap along the central axis of said roll of core wound media and said sleeve, and said hub portions each having an opening and resilient means on the protruding end engageable with the opposed resilient means and opening of the other hub portion respectively for interlocking said end caps, whereby pressure engagement of said resilient means light sealably interlocks said end caps with said sleeve therebetween.

11. A light-tight, self-contained canister for preventing a roll of core wound photosensitive media containable therein, from being damaged or exposed to actinic light during shipping, storing and dispensing, comprising:
    an opaque sleeve for surrounding the roll of core wound photosensitive media, and said sleeve having two outer edges and a media exit slot running along one side of said sleeve parallel to the central axis of said roll of core wound photosensitive media;
    two opposed, opaque end caps each engageable with the outer edges of said sleeve, and each having a central receiving aperture and a peripheral edge;
    a rigid tie bar extending longitudinally between said end caps along the central axis of said roll of core wound photosensitive media and said sleeve; and
    resilient means on each of said ends of said tie bar and each end engageable with the corresponding central receiving aperture in each of said end caps for interlocking said end caps and said tie bar, whereby pressure engagement of said resilient means with each of said central apertures deforms said resilient means and upon passing through said aperture said resilient means spring back to light sealably interlock said end caps and said tie bar with said sleeve therebetween.

12. The canister defined in claim 11, further comprising peripheral retaining means associated with each of said end cap peripheral edges for light sealably retaining said canister sleeve between said end caps.

13. A method for assembling a light-tight, self-contained canister in a red-light room or darkroom comprising the following steps:

placing a roll of core wound photosensitive media onto an end cap having a hub portion capable of extending into the core of the media;

inserting a tie bar along the core of the media and lockingly snapping the tie bar into an aperture formed in the hub portion of the end cap to interconnect the tie bar and end cap;

placing an opaque tubular sleeve over the roll of core wound photosensitive media into a peripheral groove formed along the edge of the end cap while guiding an end portion of the roll of core wound photosensitive media along the exit slot formed in the sleeve portion; and centering a second end cap having a hub portion over the core of the roll of core wound photosensitive media and the sleeve portion so that said hub portion comes in contact with a protruding portion of the tie bar, and lockingly snapping the end cap to the tie bar.

* * * * *

UNITED STATES PATENT AND TRADEMARK OFFICE
CERTIFICATE OF CORRECTION

PATENT NO. : 4,671,409

DATED : June 9, 1987

INVENTOR(S) : James R. Espy

It is certified that error appears in the above-identified patent and that said Letters Patent is hereby corrected as shown below:

Column 6, line 20, "claim 9" should read -- claim 8 --.

Signed and Sealed this

Sixth Day of October, 1987

Attest:

DONALD J. QUIGG

*Attesting Officer*  *Commissioner of Patents and Trademarks*